Figure 4:
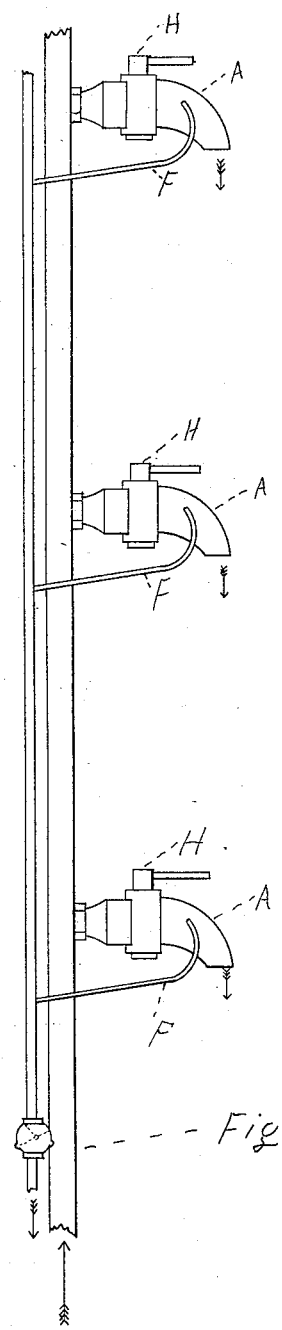

(No Model.) 2 Sheets—Sheet 1.
D. A. SUTHERLAND.
PROPORTIONAL MEASURING ATTACHMENT FOR FAUCETS.
No. 336,172. Patented Feb. 16, 1886.
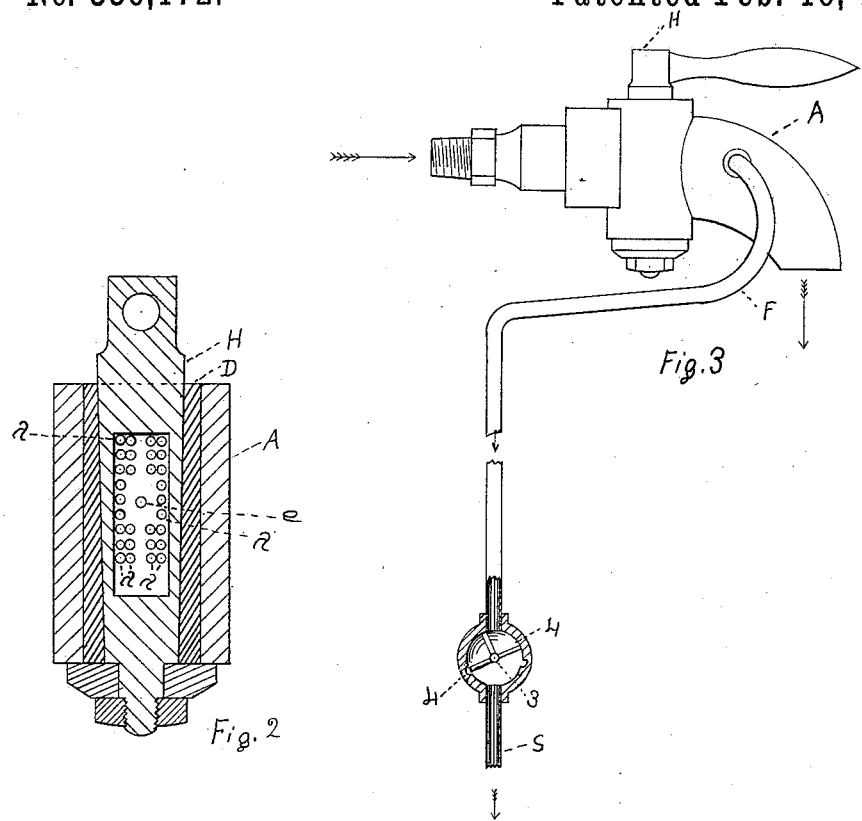
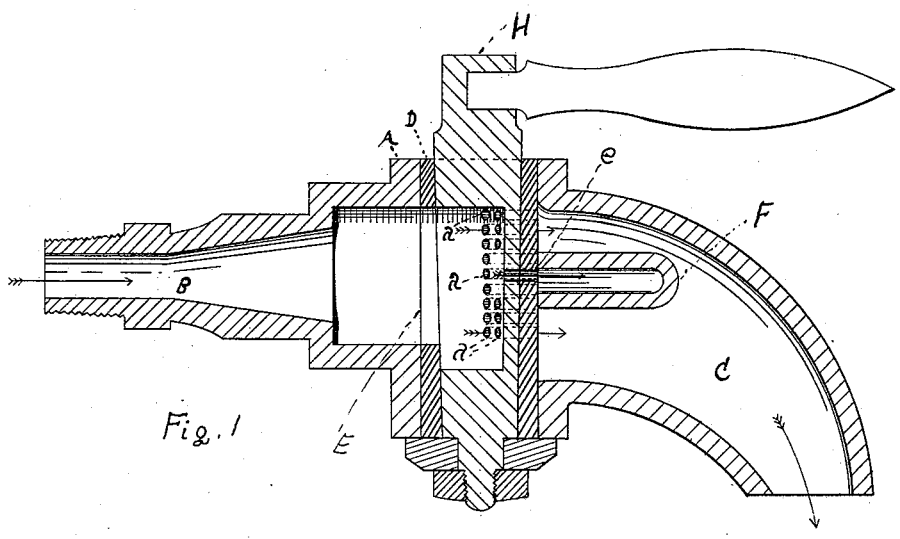
Witnesses:
C. C. Tuttle
Chas. E. Payne.
Inventor
Daniel A. Sutherland
By C. B. Tuttle
Att'y (No Model.) 2 Sheets—Sheet 2.

D. A. SUTHERLAND.
PROPORTIONAL MEASURING ATTACHMENT FOR FAUCETS.

No. 336,172. Patented Feb. 16, 1886.

Witnesses:
C. C. Tuttle
Chas. E. Payne.

Inventor:
Daniel A. Sutherland
By C. B. Tuttle
Att'y

UNITED STATES PATENT OFFICE.

DANIEL A. SUTHERLAND, OF LYNN, MASSACHUSETTS.

PROPORTIONAL MEASURING ATTACHMENT FOR FAUCETS.

SPECIFICATION forming part of Letters Patent No. 336,172, dated February 16, 1886.

Application filed November 17, 1884. Serial No. 148,107. (No model.)

*To all whom it may concern:*

Be it known that I, DANIEL A. SUTHERLAND, of Lynn, in the county of Essex and Commonwealth of Massachusetts, have invented an Improved Method of and Means for Measuring Fluids, of which the following, taken in connection with the accompanying drawings, is a specification.

This invention has reference to means for ascertaining the quantity of fluid discharged from a pipe or reservoir, and the nature of the invention is fully described hereinafter, and specifically pointed out in the claims.

In the accompanying drawings, Figure 1 is a vertical longitudinal central section of the distributing-faucet. Fig. 2 is a vertical central cross-section of the distributing-faucet. Fig. 3 is a perspective view of the distributing-faucet and measuring device, while Fig. 4 is a perspective view showing a series of distributing and a measuring device and pipe-connections, establishing together a system to be more fully described hereinafter.

The pipe or shell A is provided with an interior passage or chamber extending through the pipe longitudinally, and within this chamber is located the distributing mechanism. It may be conveniently located about midway between the two ends of the pipe or shell. The shell A, in order to receive the distributing mechanism, is bored transversely, as shown in Fig. 1, and into the opening thus made is fitted the cylinder or bushing D, the same being adapted to divide the interior passage of the shell into two parts or chambers, B and C, between which there is no communication, except through openings in the cylinder, and to this end the cylinder is provided with an opening or port, E, to admit the fluid into the cylinder and eduction-ports $d$ and $e$, the ports $d$ discharging into the exhaust end of shell A, while the port $e$ discharges into a pipe, F, that leads to the measuring device, to be referred to hereinafter. It is preferable, for reasons to be hereinafter stated, to have the ports $d$ equal in size to the port $e$, and increase the number of ports $d$, as more fluid is to be passed in that direction; but the principle of my invention is as completely, though not so advantageously, involved in case one port $d$ larger or smaller than the port $e$ is employed. In the longitudinal bore of the cylinder thus arranged is fitted the spigot H, as shown in Fig. 1. Said spigot has an interior chamber, leading to which, on one side of the spigot, is an induction-port corresponding to the induction-port in the cylinder, and leading from said chamber in the opposite side of the spigot are eduction-ports corresponding with the eduction-ports $d$ $e$ in the cylinder. Said ports are so distributed as by a proper turn of the spigot to be brought to register with the corresponding ports in the cylinder, in which position of the spigot fluid admitted into the chamber of the spigot will be distributed by and discharged through the ports $d$ $e$, as before described, and to stop the discharge it is only necessary to turn the spigot H sufficiently to carry the ports in the spigot out of line with the ports in the cylinder. To this end the spigot is provided with a suitable handle, whereby the operator may turn the spigot in the manner of an ordinary faucet-spigot.

It should be observed that the opening and closing of the eduction-ports is performed by turning the spigot, that the operation is performed by the workman in charge, and is entirely under his control and dependent upon no other agency whatsoever. It will be understood of course that while the eduction-ports should open simultaneously, yet the movement of the spigot H may be such as to open the ports in whole or in part, thus regulating the flow of fluid through the exhaust end of the faucet or shell A.

The fluid which exhausts through the port $e$ passes into pipe F, and is conducted thereby to the measuring device. Said measuring device may be of any ordinary construction adapted to measure fluids, and may be located at any convenient place along the pipe F.

The measuring device shown in the drawings comprises a shaft, 3, and buckets 4 4, the shaft being adapted to rock in its bearings, and the buckets being mounted thereon and balanced so that one bucket when filled with fluid from the pipe F will drop downward, thereby bringing the other bucket into position to be filled and discharging its own contents into the pipe S, whereby it is conducted to waste or to a receiving-tank, if desired. When the second bucket is filled it in turn drops downward, discharging its own contents and bringing the first bucket into position as before. In this manner all fluid passing through pipe F empties into one of the buckets 4. The balancing of the buckets is such as to enable the bucket to hold a certain quantity of fluid before being depressed, and this quantity being known the whole quantity exhausted through pipe F may be ascertained by multiplying this quantity into the number of depressions or movements of the shaft 3. To this end any ordinary registering device may be attached to shaft 3 to complete the movements thereof. This measuring device is not my invention; but I have adopted the same as useful in connection with my invention, because of its simplicity and reliability, and other means for measuring could be employed. The measuring mechanism can be located within a case, if desired, and locked from intruders.

The results to be obtained by this invention are a knowledge of the quantity of fluid taken from the supply-pipe or reservoir and the amount discharged through the faucet or ports $d$. To this end we regard the size of the port $e$ as a unit of measure and divide it into the size of all the ports $d$ and the ports $e$ added together, and this product we multiply by the quantity of fluid exhausted through port $e$. The result gives the whole quantity of fluid taken from the pipe or reservoir. To ascertain the quantity discharged through ports $d$, we divide the size of the port $e$ into the size of all the ports $d$ added together, and proceed as before. This measurement is based upon the hydrostatic law that from a body of fluid under pressure equal quantities of said fluid will escape through equal openings in a given time, the conditions of passage being equal, and to this end I prefer to make the ports $d$ equal in size to the port $e$, as the frictional conditions of passage are then more nearly equal and the measurement thereby rendered more exact.

In Fig. 4 of the drawings are represented several distributing-faucets constructed as above described. Each one of said faucets has independent connection with the general supply-pipe, and the pipes F, leading from the faucets to a convenient point, coalesce into one pipe which leads to the measuring device. When thus arranged, fluid may be drawn from one or more of said faucets and the quantity exhausted from the common pipe will, by operating as above described, indicate the quantity taken from the supply by all of the faucets, or discharged through the faucets, as before stated. The several faucets may be distributed throughout a building or house, and water or fluid supplied to the whole building may be ascertained from the one measuring and registering mechanism.

Having thus described my invention and the best manner known to me of operating the same, I claim as my invention and desire by Letters Patent to secure—

1. A device for distributing fluid, having an induction-port to receive fluid and eduction-ports of equal size adapted to discharge the fluid under conditions of passage substantially equal, as described, in combination with means for varying equally the size of all the discharge-ports or for closing them altogether, and a measuring device connected with one of the eduction-ports and adapted to measure the quantity of fluid discharged therefrom, substantially as described.

2. A device for distributing fluid, having an interior chamber and an induction-port leading to the same, and a series of eduction-ports leading from the chamber and adapted to discharge fluid under conditions of passage substantially equal, as described, and means located within said interior chamber having openings corresponding to the eduction-ports and registering therewith and adapted to be operated to stop the flow of fluid through the eduction-ports simultaneously in whole or in part by being moved entirely or partly out of alignment with said eduction-ports, said means being under the direct control and subject to the will of the operator, substantially as and for the purposes described.

3. A device for distributing fluid, having an interior chamber and an induction-port leading to the same, and two or more eduction-ports of equal size leading therefrom and adapted to discharge fluid under conditions of passage substantially equal, as described, and means located within said interior chamber and adapted to be operated to stop the flow of fluid through the eduction-ports in whole or in part simultaneously, as described, said means being under the direct control of the operator, and a measuring device communicating with one of said eduction-ports and adapted to measure the quantity of liquid discharged therefrom, substantially as described.

4. The combination, in a device for distributing fluid, of an interior chamber having an induction-port leading thereto and a discharge-passage leading therefrom, the said chamber being separated by a dividing-wall having eduction-ports therein, one of said ports leading to a measuring device, and all being of equal size and adapted to discharge fluid under the same conditions of passage, and a device for regulating the flow of the liquid through the said ports or shutting it off altogether, the said device having perforations corresponding to the eduction-ports and adapted to register therewith, to allow the liquid to flow, and to be moved out of register therewith to stop the flow of the liquid, substantially as described.

Signed at Lynn, Massachusetts.

D. A. SUTHERLAND.

In presence of—
M. G. COOK,
C. B. TUTTLE.